US010970821B2

(12) United States Patent
Yan et al.

(10) Patent No.: US 10,970,821 B2
(45) Date of Patent: Apr. 6, 2021

(54) IMAGE BLURRING METHODS AND APPARATUSES, STORAGE MEDIA, AND ELECTRONIC DEVICES

(71) Applicant: SHENZHEN SENSETIME TECHNOLOGY CO., LTD, Shenzhen (CN)

(72) Inventors: Qiong Yan, Shenzhen (CN); Wenxiu Sun, Shenzhen (CN)

(73) Assignee: SHENZHEN SENSETIME TECHNOLOGY CO., LTD, Shenzhen (CN)

( * ) Notice: Subject to any disclaimer, the term of this patent is extended or adjusted under 35 U.S.C. 154(b) by 68 days.

(21) Appl. No.: 16/457,438

(22) Filed: Jun. 28, 2019

(65) Prior Publication Data

US 2019/0325564 A1  Oct. 24, 2019

Related U.S. Application Data

(63) Continuation of application No. PCT/CN2018/087372, filed on May 17, 2018.

(30) Foreign Application Priority Data

May 19, 2017 (CN) .......................... 201710359299.3

(51) Int. Cl.
*G06T 5/00* (2006.01)
*G06T 7/593* (2017.01)
(Continued)

(52) U.S. Cl.
CPC ............ *G06T 5/002* (2013.01); *G06K 9/6201* (2013.01); *G06T 5/50* (2013.01); *G06T 7/593* (2017.01); *G06T 2207/10028* (2013.01)

(58) Field of Classification Search
CPC ........... G06T 5/002; G06T 5/50; G06T 7/593; G06T 2207/10028; G06T 2207/10012;
(Continued)

(56) References Cited

U.S. PATENT DOCUMENTS 8,346,005 B2   1/2013 Zhang
9,426,444 B2   8/2016 Guigues
(Continued)

FOREIGN PATENT DOCUMENTS

CN   102542541 A   7/2012
CN   103814306 A   5/2014
(Continued)

OTHER PUBLICATIONS

International Search Report in the international application No. PCT/CN2018/087372, dated Aug. 1, 2018.
(Continued)

*Primary Examiner* — John B Strege
(74) *Attorney, Agent, or Firm* — Syncoda LLC; Feng Ma

(57) ABSTRACT

Image blurring methods and apparatuses, storage media, and electronic devices can include: obtaining a main image and a secondary image obtained by photographing the same object with a dual-lens camera; obtaining depth data and depth confidence degree data according to the main image and the secondary image, the depth data indicating depth values of corresponding pixel points in the main image and the secondary image, and the depth confidence degree data indicating confidence degrees of the depth values in the depth data; correcting at least one depth value in the depth data according to the depth confidence degree data; and blurring the main image according to corrected depth data.

20 Claims, 10 Drawing Sheets

(51) Int. Cl.
*G06K 9/62* (2006.01)
*G06T 5/50* (2006.01)

(58) Field of Classification Search
CPC .. G06T 3/0012; G06K 9/6201; G06K 9/6202; H04N 5/2257; H04N 5/2258; H04N 5/23235
See application file for complete search history.

(56) References Cited

U.S. PATENT DOCUMENTS

| | | | | |
|---|---|---|---|---|
| 9,747,694 | B2 * | 8/2017 | Chung | G06T 5/006 |
| 10,019,810 | B2 * | 7/2018 | Arnison | G06T 7/571 |
| 2008/0219654 | A1 * | 9/2008 | Border | H04N 5/2258 396/89 |
| 2011/0069884 | A1 | 3/2011 | Zhang | |
| 2011/0280475 | A1 | 11/2011 | Singhal | |
| 2013/0142415 | A1 * | 6/2013 | Ali | H04N 13/271 382/154 |
| 2014/0253679 | A1 | 9/2014 | Guigues | |
| 2015/0116464 | A1 * | 4/2015 | Tanaka | G06T 5/002 348/49 |
| 2015/0319421 | A1 * | 11/2015 | Chung | H04N 13/271 348/46 |
| 2017/0061701 | A1 * | 3/2017 | Mittal | G06T 5/002 |
| 2017/0270644 | A1 * | 9/2017 | Zhao | G06T 11/60 |
| 2018/0091798 | A1 * | 3/2018 | Chang | H04N 13/271 |
| 2018/0114327 | A1 * | 4/2018 | Ikemoto | G06T 7/593 |

FOREIGN PATENT DOCUMENTS

| | | |
|---|---|---|
| CN | 103945118 A | 7/2014 |
| CN | 104424640 A | 3/2015 |
| CN | 104853080 A | 8/2015 |
| CN | 105007475 A | 10/2015 |
| CN | 105139355 A | 12/2015 |
| CN | 105163042 A | 12/2015 |
| CN | 107613199 A | 1/2018 |

OTHER PUBLICATIONS

Hirschmuller H. Stereo processing by semiglobal matching and mutual information[J]. IEEE Transactions on pattern analysis and machine intelligence, 2008, 30(2): 328-341.

Xu G, Zhang Z. Epipolar geometry in stereo, motion and object recognition: a unified approach[M]. Springer Science & Business Media, 2013.

* cited by examiner

IMAGE BLURRING METHODS AND APPARATUSES, STORAGE MEDIA, AND ELECTRONIC DEVICES

CROSS-REFERENCE TO RELATED APPLICATIONS

This is a continuation application of International Patent Application No. PCT/CN2018/087372 filed on May 17, 2018, which claims priority to Chinese Patent Application No. 201710359299.3 filed on May 19, 2017. The disclosures of these applications are incorporated herein by reference in their entirety.

BACKGROUND

Background blurring of images can enable photography subjects to be displayed clearly, and is popular with photography enthusiasts. For now, an image blurring effect is mainly achieved by using an optical imaging principle, i.e., using a large lens aperture for implementation on hardware. Therefore, the image blurring function is mainly integrated on professional cameras such as a single-lens reflex camera.

SUMMARY

Embodiments of the present disclosure relate to image processing technologies, and in particular, to image blurring methods and apparatuses, storage media, and electronic devices.

Embodiments of the present disclosure provide technical solutions of image blurring.

An image blurring method provided according to one aspect of the embodiments of the present disclosure includes: obtaining a main image and a secondary image obtained by photographing a same object with a dual-lens camera; obtaining, according to the main image and the secondary image, depth data and depth confidence degree data, the depth data indicating depth values of corresponding pixel points in the main image and the secondary image, and the depth confidence degree data indicating confidence degrees of the depth values in the depth data; correcting, according to the depth confidence degree data, at least one depth value in the depth data; and blurring, according to corrected depth data, the main image.

An image blurring apparatus further provided according to another aspect of the embodiments of the present disclosure includes: a first obtaining module configured to obtain a main image and a secondary image obtained by photographing a same object with a dual-lens camera; a second obtaining module configured to obtain depth data and depth confidence degree data according to the main image and the secondary image, the depth data indicating depth values of corresponding pixel points in the main image and the secondary image, and the depth confidence degree data indicating confidence degrees of the depth values in the depth data; a correcting module configured to correct at least one depth value in the depth data according to the depth confidence degree data; and a blurring module configured to blur the main image according to corrected depth data.

A storage medium also provided according to still another aspect of the embodiments of the present disclosure stores at least one executable instruction, where the executable instruction is adapted to be loaded by a processor and execute operations corresponding to the image blurring method according to any one of the foregoing embodiments.

An electrode device also provided according to yet another aspect of the embodiments of the present disclosure includes: a processor; and a memory for storing instructions executable by the processor; wherein execution of the instructions by the processor causes the processor to perform operations corresponding to the image blurring method according to any one of the foregoing embodiments.

A computer program also provided according to yet another aspect of the embodiments of the present disclosure includes a computer-readable code, where when the computer-readable code runs in a device, a processor in the device executes instructions for implementing the image blurring method according to any one of the foregoing embodiments.

According to the image blurring methods and apparatuses, the storage media, and the electronic devices of the embodiments of the present disclosure, the accuracy of depth data is effectively improved by obtaining the depth data and depth confidence degree data of a main image and a secondary image obtained by photographing the same object with a dual-lens camera and correcting the depth data by means of the depth confidence degree data. On this basis, the blurring effect of the main image can be improved by blurring the main image by means of the corrected depth data.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
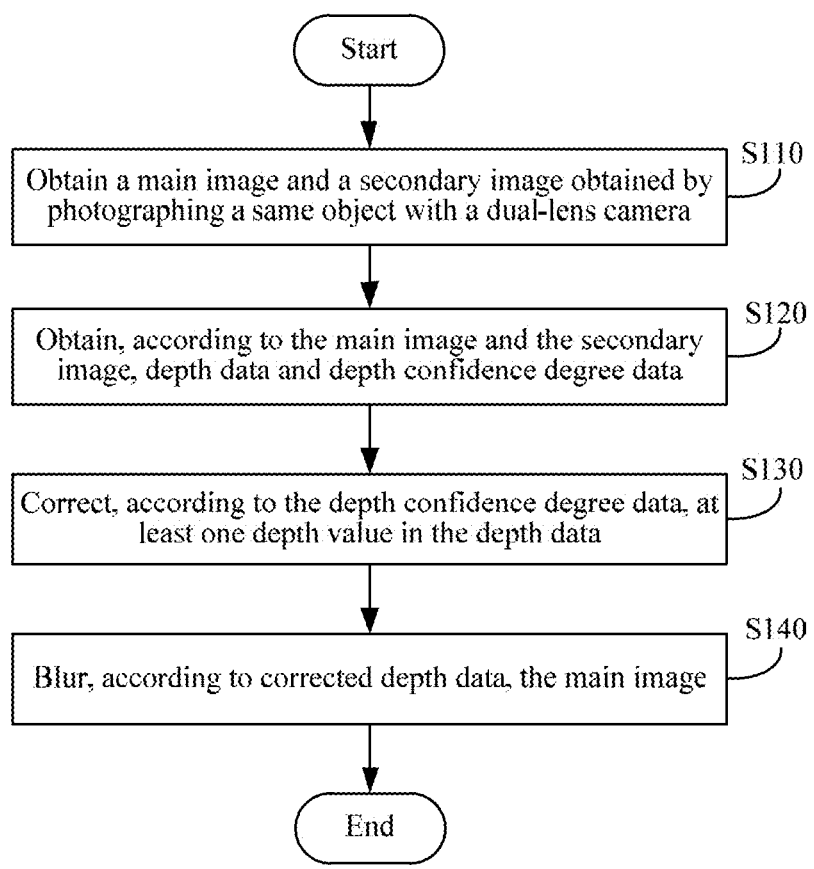
FIG. 1 illustrates a flowchart of an image blurring method according to one embodiment of the present disclosure.

The implementations of the embodiments of the present disclosure are further described in detail below with reference to the accompanying drawings (the same reference numerals in a plurality of accompanying drawings represent the same elements) and the embodiments. The following embodiments are intended to illustrate the present disclosure, but are not intended to limit the scope of the present disclosure.

A person skilled in the art may understand that the terms such as "first" and "second" in the embodiments of the present disclosure are only used to distinguish different operations, devices or modules, etc., and do not represent any specific technical meaning or an inevitable logical sequence therebetween.

In addition, it should be understood that, for ease of description, the size of each part shown in the accompanying drawings is not drawn in actual proportion.

The following descriptions of various exemplary embodiments are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed cloud computing environments, the program modules may be located in local or remote computing system storage media including storage devices.

The inventors of the present application have recognized that, with the increasing popularity of smart phones, most users use mobile phones to take photos. However, due to the limit of the thickness of a mobile phone, only the small-aperture lens can be installed in the mobile phone, and thus the mobile phone can only generate a weak blurring effect in the case of a close distance, but no image with the blurring effect can be generated in other scenes.

FIG. 1 is a flowchart of an image blurring method according to one embodiment of the present disclosure.

Referring to FIG. 1, in operation S110, a main image and a secondary image obtained by photographing the same object with a dual-lens camera are obtained.

The dual-lens camera can photograph the same scene at different angles to obtain two pictures, i.e., the main image and the secondary image (or a left image and a right image), and which one of the two pictures is used as the main image and which one is used as the secondary image is determined in the way set before the dual-lens camera leaves the factory. The dual-lens camera can be provided on a mobile smart terminal which cannot be integrated with a large-aperture lens due to the limit of the thickness, such as the dual-lens camera on a smart phone.

In the main image and the secondary image obtained by photographing the same object with the dual-lens camera, the main image is the picture finally presented to users. According to the image blurring method of the embodiments of the present disclosure, the main image photographed by the dual-lens camera is blurred to improve the blurring effect of the main image.

In an optional example, the operation S110 may be performed by a processor by invoking a corresponding instruction stored in a memory, and may also be performed by a first obtaining module 310 run by the processor.

In operation S120, depth data and depth confidence degree data are obtained according to the main image and the secondary image, where the depth data indicates depth values of corresponding pixel points in the main image and the secondary image, and the depth confidence degree data indicates confidence degrees of the depth values in the depth data.

The depth confidence degree data indicates confidence degrees of the depth values in the depth data and thus can represent the accuracy of the depth data, i.e., the accuracy of the depth values of the pixel points in the obtained main and secondary images can be separately represented by means of the depth confidence degree data of the main and secondary images, where the depth vale is a distance from the photographed objected corresponding to the pixel points in the photographed picture (main image or secondary image) to the camera.

The way of obtaining the depth data and the depth confidence degree data is not defined in this embodiment. For example, during depth data obtaining, the depth data of the main image and the secondary image can be obtained by performing stereo matching on the main image and the secondary image, or using other image processing technologies and a deep neural network to process the main image and the secondary image. However, no limitation is made thereto.

In an optional example, the operation S120 may be performed by a processor by invoking a corresponding instruction stored in a memory, and may also be performed by a second obtaining module 320 run by the processor.

In operation S130, at least one depth value in the depth data is corrected according to the depth confidence degree data.

For example, the depth value having a lower confidence degree in the depth data of the main image is corrected according to the depth confidence degree data of the main image, so that the depth value of each pixel point in the main image indicated by the depth data of the main image becomes more accurate.

In an optional example, the operation S130 may be performed by a processor by invoking a corresponding instruction stored in a memory, and may also be performed by a correcting module 330 run by the processor.

In operation S140, the main image is blurred according to corrected depth data.

According to one or more embodiments of the present disclosure, the depth data of the main image is corrected according to the depth confidence degree data of the main image, proposed blurring data for blurring and rendering is calculated according to the corrected depth data of the main image, and the partial area in the main image is blurred or the pixel value of some pixel points in the main image is adjusted, so as to blur and render the main image. Since the depth data of the main image can indicate the pixel values of the pixel points in the main image more accurately after being corrected by means of the depth confidence degree data, further performing blurring according to the corrected depth data can effectively improve the blurring effect of the main image, thereby solving the problem that an image photographed by a dual-camera phone has no blurring effect or has a weak blurring effect.

In an optional example, the operation S140 may be performed by a processor by invoking a corresponding instruction stored in a memory, and may also be performed by a blurring module 340 run by the processor.

According to the image blurring methods of the embodiments of the present disclosure, the accuracy of depth data is effectively improved by obtaining the depth data and depth confidence degree data of a main image and a secondary image obtained by photographing the same object with a dual-lens camera and correcting the depth data by means of the depth confidence degree data. On this basis, the blurring effect of the main image can be improved by blurring the main image by means of the corrected depth data.

In practical applications, the image blurring method of this embodiment can be implemented by a camera, image processing programs, or an intelligent terminal having a camera function, etc. However, a person skilled in the art should know that in practical applications, any device that has corresponding image processing and data processing functions can implement the image blurring method of the embodiments of the present disclosure with reference to this embodiment.

Figure 2:
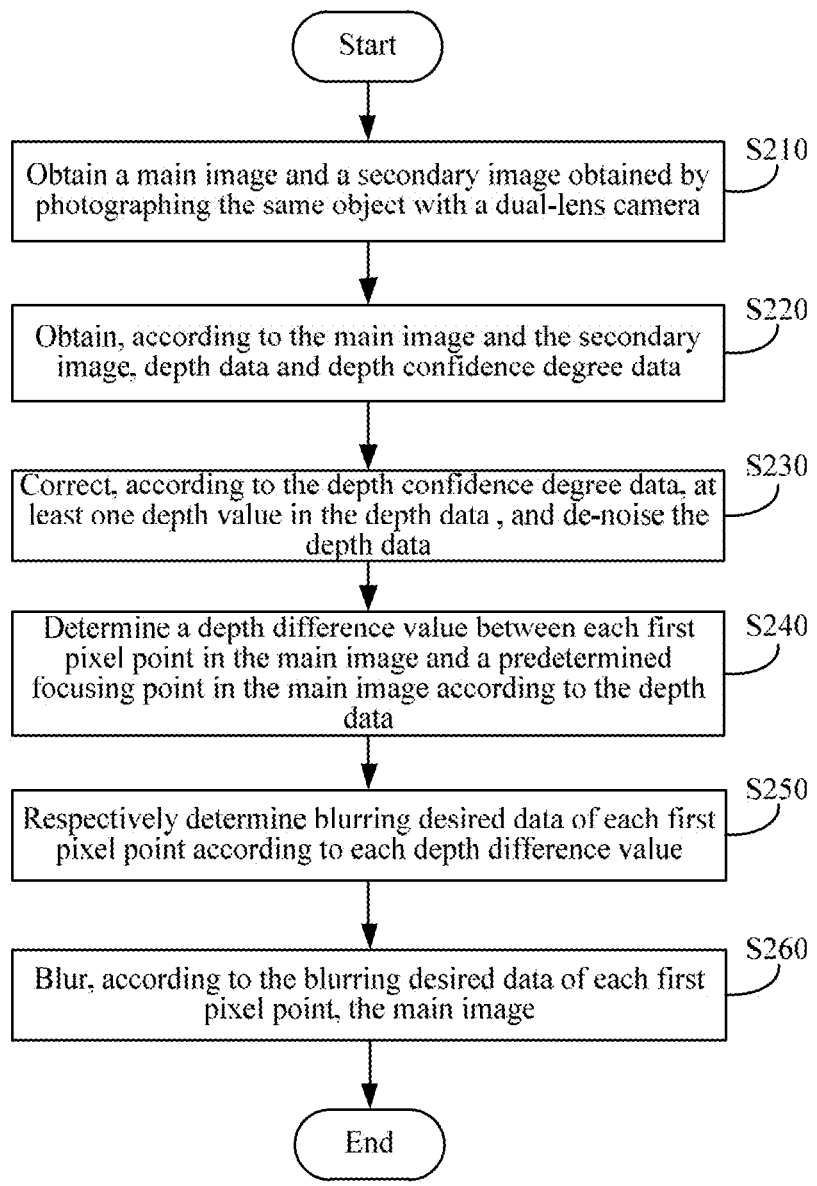
FIG. 2 illustrates a flowchart of an image blurring method according to another embodiment of the present disclosure.

FIG. 2 is a flowchart of an image blurring method according to another embodiment of the present disclosure.

Referring to FIG. 2, in operation S210, a main image and a secondary image obtained by photographing the same object with a dual-lens camera are obtained.

Figure 3:
FIG. 3 illustrates a main image photographed by a dual-lens camera provided according to another embodiment of the present disclosure.
Figure 4:
FIG. 4 illustrates a secondary image photographed by a dual-lens camera provided according to another embodiment of the present disclosure.

For example, the main image and the secondary image obtained in this embodiment according to FIGS. 3 and 4. The main image and the secondary image are two pictures obtained by photographing the same scene by the dual-lens camera at different angles. It can be known from FIGS. 3 and 4 that the positions of ears of toy dolls close to edges of the pictures in the main image and the secondary image are different (the positions relative to a mousepad on the top of a table are different).

In an optional example, the operation S210 may be performed by a processor by invoking a corresponding instruction stored in a memory, and may also be performed by a first obtaining module 310 run by the processor.

In operation S220, depth data and depth confidence degree data are obtained according to the main image and the secondary image, where the depth data indicates depth values of corresponding pixel points in the main image and the secondary image, and the depth confidence degree data indicates confidence degrees of the depth values in the depth data.

In an optional implementation, initial depth data is obtained by performing stereo matching on the main image and the secondary image. Furthermore, depth calibration is performed on the initial depth data to position the corresponding pixel points of the main image and the secondary image at the same depth so as to obtain the calibrated depth data of the main image and the secondary image. Here, the initial depth data can be rapidly and accurately obtained by means of stereo matching. By calibrating the initial depth data, in the case that the corresponding pixel points of the main image and the secondary image are not positioned at the same depth resulting from the dual-lens camera slightly displacing or rotating due to factors such as collision, the corresponding pixel points of the main image and the secondary image can be positioned at the same depth, thereby preventing subsequent image processing operations from being affected.

In this embodiment, after obtaining the depth data of the main image and the secondary image, the depth confidence degree data of the main image is also obtained. For example, if the corresponding pixel points in the main image and the secondary image have the same depth value, a depth confidence degree value greater than a reference value is assigned to each of the depth values of the corresponding pixel points, and if the corresponding pixel points in the main image and the secondary image have different depth values, depth confidence degree values smaller than the reference value are assigned to the depth values of the corresponding pixel points; and/or, if the depth value of the pixel points in the main image exceeds a preset range, a depth confidence degree value smaller than the reference value is assigned to each of the pixel points of which the depth value exceeding the preset range, and if the depth value of the pixel points in the main image does not exceed the preset range, a depth confidence degree value greater than the reference value is assigned to the depth value of the pixel points; and/or, if the pixel points in the main image have two or more depth values, a depth confidence degree value smaller than the reference value is assigned to each of the depth values of the pixel points having two or more depth values, and if the pixel points in the main image have the same depth value, a depth confidence degree value greater than the reference value is assigned to the depth value of the corresponding pixel points.

Figure 5:
FIG. 5 illustrates a depth image of a main image provided according to another embodiment of the present disclosure.

According to one or more embodiments of the present disclosure, the depth data and the depth confidence degree data are respectively a depth image and a confidence degree image. For example, referring to the depth image of the main image in FIG. 5, the value of each pixel point in the depth image represents a depth value of a corresponding first pixel point in the main image. The value of each pixel point in the corresponding depth confidence degree image (not shown) of the main image represents a confidence degree of the depth value of the corresponding first pixel point. Here, the sizes of the depth image and the confidence degree image of the main image are identical to the size of the main image.

In an optional example, the operation S220 may be performed by a processor by invoking a corresponding instruction stored in a memory, and may also be performed by a second obtaining module 320 run by the processor.

In operation S230, at least one depth value in the depth data is corrected according to the depth confidence degree data, and the depth data is de-noised.

According to one or more embodiments of the present disclosure, if the depth data of the main image is corrected according to the corresponding depth confidence degree data of the main image, the depth value of a pixel point having the minimum depth confidence degree value is replaced with the depth value of a neighboring pixel point having the maximum depth confidence degree value, so as to avoid a large error that may occur in the depth values determined for the pixel points in the main image, make the depth values indicated by the depth data more accurate, and improve the accuracy of the depth data.

In addition, in order to further improve the accuracy of the obtained depth data, the depth data can also be de-noised. According to one or more embodiments of the present disclosure, the de-noising can include filtering the depth data by using a filter, and/or, increasing the depth values in the depth data according to a preset proportion. For example, a smoothing filter is used so that the pixel points with similar colors in the main image have similar depth values, and thus the accuracy of the depth data is further improved; and the depth values in the depth data are stretched to increase the depth values in the depth data according to the preset proportion to increase the contrast among the depth values of the pixel points.

In an optional example, the operation S230 may be performed by a processor by invoking a corresponding instruction stored in a memory, and may also be performed by a correcting module 330 and a de-noising module 350 run by the processor.

In operation S240, a depth difference value between each first pixel point in the main image and a predetermined focusing point in the main image is determined according to the depth data.

In this embodiment, before the execution of the operation, focusing point information of the main image is obtained by means of inputting. According to one or more embodiments of the present disclosure, during the blurring of the photographed main image, a user can select and click a point or area in the main image, or input coordinates or other data of a point or area in the main image and use the point or area as a focusing point or focusing area of the main image. For example, if the main image includes a person and a vehicle, the user can click the person as the focusing point; by implementing the image blurring method of this embodiment, the person in the main image is displayed more clearly, and the vehicle and other background areas in the main image are displayed less clearly.

Certainly, in other embodiments, in the case that the user has selected a focusing point when photographing the main image, information of the determined focusing points in the main image can also be directly obtained during the execution of the operation, where the focusing point selected by the user is a focusing point selected during autofocusing of the camera when the user photographs the main image.

The predetermined focusing point in the main image is determined according to the obtained focusing point information; the depth values of each first pixel point and the predetermined focusing point in the main image are obtained according to the de-noised depth data; and a difference value between the depth values of each first pixel point and the predetermined focusing point is calculated.

In an optional example, the operation S240 may be performed by a processor by invoking a corresponding instruction stored in a memory, and may also be performed by a fourth obtaining unit 341 in the blurring module 340 run by the processor.

In operation S250, the blurring desired data of each first pixel point is respectively determined according to each depth difference value.

In this embodiment, the blurring desired data of each first pixel point is calculated according to the depth difference value between each first pixel point in the main image and the predetermined focusing point, for use to indicate a desired or proposed blurring degree of blurring each first pixel point in the main image. Here, the blurring desired data includes, but is not limited to, a blurring radius length or diameter length, etc., and the blurring diameter length may include, but is not limited to, a radius, a diameter, or other information of a circle of confusion of the blurred pixels.

According to one or more embodiments of the present disclosure, the blurring desired data of a first pixel point includes the blurring radius. For example, the blurring radius c of a first pixel point is calculated through a formula: $c=A*abs(d0-d)$, where abs is an absolute value function, A is an aperture size of the simulated large-aperture lens, d0 is the depth value of the predetermined focusing point, and d is the depth value of the first pixel point.

When d is equal to d0, the first pixel point and the predetermined focusing point are at the same length, the blurring radius c is equal to 0, and thus the first pixel point requires no blurring. When d is not equal to d0, the first pixel point is far away from the predetermined focusing point, and the closer the distance, the smaller the blurring radius c, and the further the distance, the greater the blurring radius c. That is, in the main image, the predetermined focusing point is not blurred; during blurring, the blurring degree of a focusing area neighboring to the predetermined focusing point is small; and during blurring, the blurring degree of an area away from the predetermined focusing point is great, and the further the distance, the greater the blurring degree.

In an optional example, the operation S250 may be performed by a processor by invoking a corresponding instruction stored in a memory, and may also be performed by a fourth obtaining unit 341 in the blurring module 340 run by the processor.

In operation S260, the main image is blurred according to the blurring desired data of each first pixel point.

In an optional implementation, a method for blurring and rendering the main image according to the obtained blurring desired data includes: generating a blurred image of which a pixel point corresponds to the first pixel point of the maim image and a pixel value is an initial value; respectively determining an initial blurring weight value of a corresponding second pixel point in the blurred image according to the blurring desired data of each first pixel point in the main image; performing at least one update on at least one second pixel point in the blurred image, the update including: updating, according to a pixel value of a first pixel point and a current blurring weight value of a second pixel point corresponding to the first pixel point, a current pixel value and a current blurring weight value of at least one neighboring second pixel point of the corresponding second pixel point; and obtaining a blurring result of the main image according to the updated blurred image.

According to one or more embodiments of the present disclosure, during the generating of the blurred image, a blurred image having the same size as the main image and pixel points in one-to-one correspondence to the first pixel points in the main image is generated, and the pixel value of each second pixel point in the blurred image is initialized as 0 (or a certain identical value). Here, both the first pixel points and the second pixel points can be represented by coordinates (x, y) because the main image and the blurred image have equal size and the first pixel points and the second pixel points have one-to-one correspondence. It should be noted here that in practical applications, the blurred image of the main image can also be generated before the execution of the operations S210 to S250 to obtain the blurring desired data of the main image.

In this embodiment, an initial blurring weight value of each second pixel point in the blurred image is obtained according to the blurring desired data, for use to simulate a blurring process of a lens having a large aperture (such as a single-lens reflex camera) during imaging to blur and render the main image. According to one or more embodiments of the present disclosure, the blurring desired data includes the blurring radius, and during the obtaining of the initial blurring weight value, respective initial blurring weight values w(x, y) are respectively determined for the second pixel points (x, y) in the blurred image according to a formula: w(x, y)=1/c(x, y)2, where c(x, y) is the blurring radius of a first pixel point (x, y). That is, the greater the blurring radius of the first pixel point, the smaller the initial blurring weight value of the corresponding second pixel point.

According to one or more embodiments of the present disclosure, a distance between the neighboring second pixel point and the corresponding second pixel point meets a set requirement. For example, the set requirement is that the distance is smaller than or equal to the blurring radius, i.e., the blurring radius of the first pixel point is greater than the distance between the corresponding second pixel point and the neighboring second pixel points.

During the updating of the second pixel points in the blurred image, a scattering operation for each second pixel point (x, y) in the blurred image is performed on multiple neighboring second pixel points (x', y'), so as to update a current pixel value I(x', y') and a current blurring weight value w(x', y'). For example, new I(x', y') is obtained by accumulating I(x', y')*w(x, y) on the basis of I(x', y'), to update the current pixel value once; and new w(x', y') is obtained by accumulating w(x, y) on the basis of w(x', y'), to update the current blurring weight value once.

The blurred image is updated by continuously updating the current pixel value and the current blurring weight value of each second pixel point until all the second pixel points are updated.

According to one or more embodiments of the present disclosure, the pixel value of each second pixel point in the blurred image is normalized according to a current pixel value and a current blurring weight value of each second pixel point in the updated blurred image, and the normalized blurred image is used as the blurring result.

In this embodiment, the current pixel value of each second pixel point is normalized according to the updated current pixel value and current blurring weight value of each second pixel point, so as to obtain the pixel value of each second pixel point. That is, the pixel value of a second pixel point is the ratio of the updated current pixel value to the updated current blurring weight value. Each obtained pixel value is determined as the pixel value of each second pixel point in the blurred image, and the processed blurred image is determined as the blurring result of the main image.

In an optional example, the operation S260 may be performed by a processor by invoking a corresponding instruction stored in a memory, and may also be performed by a blurring unit in the blurring module 340 run by the processor.

Figure 6:
FIG. 6 illustrates a blurred main image provided according to another embodiment of the present disclosure.

Referring to the blurred main image in FIG. 6, the blurred main image has an obvious blurring effect. The focusing area (the focusing area is the face area of the toy doll at the left side) in FIG. 6 is not blurred or has a small blurring degree, and thus can be clearly displayed; and as the distance increases, the blurring degrees of the pixel points distant from the focusing area become greater and greater, and the pixel points are thus displayed more and more blurrily.

According to the image blurring methods of the embodiments of the present disclosure, the accuracy of depth data is effectively improved by obtaining the depth data and depth confidence degree data of a main image and a secondary image obtained by photographing the same object with a dual-lens camera, correcting the depth data by means of the depth confidence degree data, and de-noising the depth data. On this basis, the blurring effect of the main image can be improved by blurring the main image by means of the corrected depth data. Moreover, during the blurring, the main image is blurred and rendered by simulating the blurring process of a large-aperture lens, so that the main image has an obvious blurring effect.

In practical applications, the image blurring method of this embodiment can be implemented by a camera, image processing programs, or an intelligent terminal having a camera function, etc. However, a person skilled in the art should know that in practical applications, any device that has corresponding image processing and data processing functions can implement the image blurring method of the embodiments of the present disclosure with reference to this embodiment.

Alternatively, any image blurring method provided in the embodiments of the present disclosure may be executed by a processor, for example, any image blurring method mentioned in the embodiments of the present disclosure is executed by the processor by invoking corresponding instructions stored in a memory. Details are not described below again.

A person of ordinary skill in the art may understand that all or some operations of implementing the forgoing embodiments of the method may be achieved by a program by instructing related hardware; the program can be stored in a computer readable storage medium; when the program is executed, operations including the foregoing embodiments of the method are executed. Moreover, the storage medium includes at least one medium capable of storing program code, such as ROM, RAM, a magnetic disk, or an optical disk.

Figure 7:
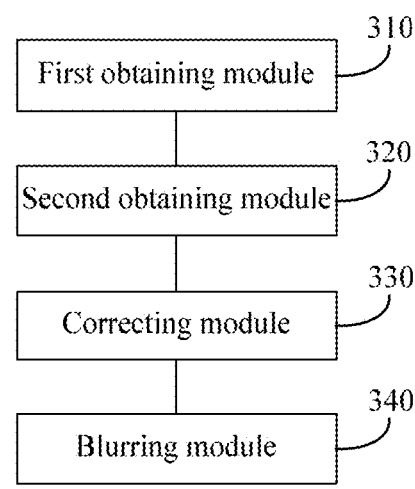
FIG. 7 illustrates a logic block diagram of an image blurring apparatus according to one embodiment of the present disclosure.

FIG. 7 is a logic block diagram of an image blurring apparatus according to one embodiment of the present disclosure. A person skilled in the art can understand that the term "module" or "unit" in the embodiments of the present disclosure may separately refer to a software module or unit such as "a program module" or "a program unit", and may also separately refer to a module or unit formed by hardware, firmware, or any form of software, hardware, and firmware. No limitation is made thereto in the embodiments of the present disclosure. Details are not described below again.

Referring to FIG. 7, the image blurring apparatus of this embodiment includes a first obtaining module 310, a second obtaining module 320, a correcting module 330, and a blurring module 340.

The first obtaining module 310 is configured to obtain a main image and a secondary image obtained by photographing the same object with a dual-lens camera; the second obtaining module 320 is configured to obtain depth data and depth confidence degree data according to the main image and the secondary image, the depth data indicating depth values of corresponding pixel points in the main image and the secondary image, and the depth confidence degree data indicating confidence degrees of the depth values in the depth data; the correcting module 330 is configured to correct at least one depth value in the depth data according to the depth confidence degree data; and the blurring module 340 is configured to blur the main image according to corrected depth data.

The image blurring apparatus of this embodiment is configured to implement the corresponding image blurring method in the forgoing method embodiments, and has the beneficial effects of the corresponding method embodiments. Details are not described below again.

Figure 8:
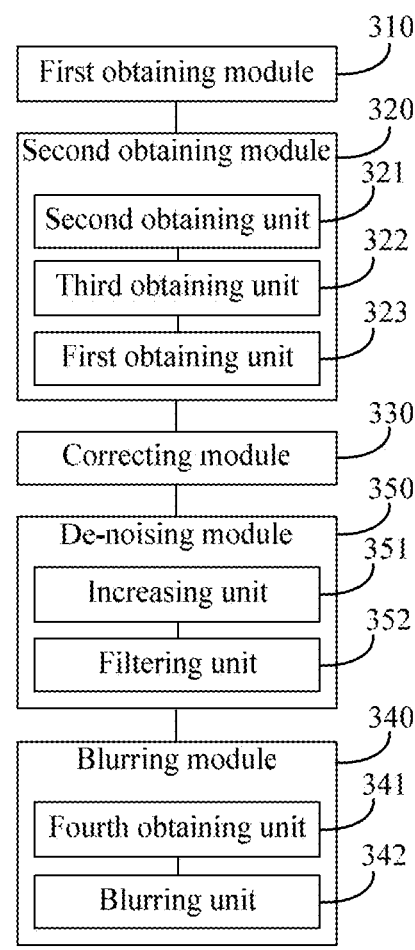
FIG. 8 illustrates a logic block diagram of an image blurring apparatus according to another embodiment of the present disclosure.

FIG. 8 is a logic block diagram of an image blurring apparatus according to another embodiment of the present disclosure.

According to the image blurring apparatus of this embodiment, the second obtaining module 320 includes a first obtaining unit 323 configured to, if the corresponding pixel points in the main image and the secondary image have the same depth value, assign a depth confidence degree value greater than a reference value to each of the corresponding pixel points; and/or, if the depth value of the pixel points in the main image exceeds a preset range, assign a depth confidence degree value smaller than the reference value to each of the pixel points of which the depth value exceeding the preset range; and/or, if the pixel points in the main image have two or more depth values, assign a depth confidence degree value smaller than the reference value to each of the pixel points having two or more depth values.

According to one or more embodiments of the present disclosure, the correcting module 330 is configured to replace the depth value of a pixel point having the minimum depth confidence degree value with the depth value of a neighboring pixel point having the maximum depth confidence degree value.

According to one or more embodiments of the present disclosure, the image blurring apparatus of this embodiment further includes: a de-noising module 350 configured to de-noise the depth data.

According to one or more embodiments of the present disclosure, the de-noising module 350 includes: a filtering unit 352 configured to filter the depth data by using a filter; and/or, an increasing unit 351 configured to increase the depth values in the depth data according to a preset proportion.

According to one or more embodiments of the present disclosure, the second obtaining module 320 includes: a second obtaining unit 321 configured to perform stereo matching on the main image and the secondary image to obtain initial depth data; and a third obtaining unit 322 configured to perform depth calibration on the initial depth data to position the corresponding pixel points of the main image and the secondary image at the same depth to obtain the depth data.

According to one or more embodiments of the present disclosure, the blurring module 340 includes: a fourth obtaining unit 341 configured to obtain blurring desired data of each first pixel point in the main image according to the corrected depth data; and a blurring unit 342 configured to blur the main image according to the blurring desired data of each first pixel point.

Figure 9:
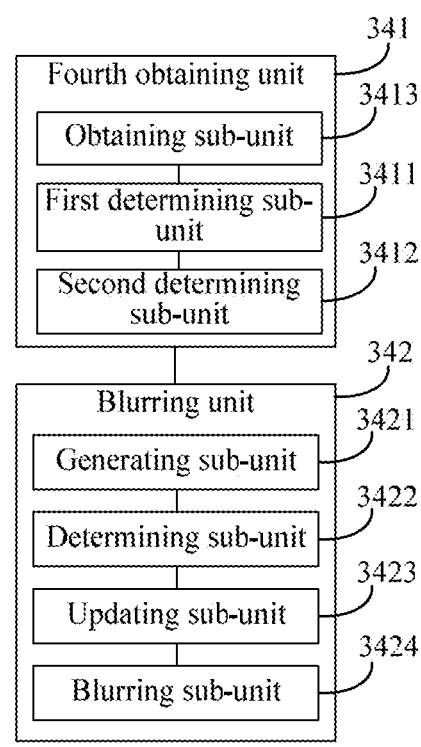
FIG. 9 illustrates a logic block diagram of a blurring module of an image blurring apparatus according to another embodiment of the present disclosure.

In an optional implementation, referring to FIG. 9, the blurring unit 342 includes: a generating sub-unit 3421 configured to generate a blurred image of which a pixel point corresponds to the first pixel point of the maim image and a pixel value is an initial value; a determining sub-unit 3422 configured to respectively determine an initial blurring weight value of a corresponding second pixel point in the blurred image according to the blurring desired data of each first pixel point in the main image; an updating sub-unit 3423 configured to perform at least one update on at least one second pixel point in the blurred image, the update including: updating, according to a pixel value of a first pixel point and a current blurring weight value of a second pixel point corresponding to the first pixel point, a current pixel value and a current blurring weight value of at least one neighboring second pixel point of the corresponding second pixel point; and a blurring sub-unit 3424 configured to obtain a blurring result of the main image according to the updated blurred image.

According to one or more embodiments of the present disclosure, a distance between the neighboring second pixel point and the corresponding second pixel point meets a set requirement.

According to one or more embodiments of the present disclosure, the blurring desired data of the first pixel point includes: a blurring radius; and a distance between the neighboring second pixel point and the corresponding second pixel point meeting a set requirement includes: the distance between the neighboring second pixel point and the corresponding second pixel point is smaller than or equal to the blurring radius.

According to one or more embodiments of the present disclosure, the blurring sub-unit 3424 is configured to normalize the pixel value of each second pixel point in the blurred image according to a current pixel value and a current blurring weight value of each second pixel point in the updated blurred image, and use the normalized blurred image as the blurring result.

According to one or more embodiments of the present disclosure, the fourth obtaining unit 341 includes: a first determining sub-unit 3411 configured to determine a depth difference value between each first pixel point in the main image and a predetermined focusing point in the main image according to the depth data; and a second determining sub-unit 3412 configured to respectively determine the blurring desired data of each first pixel point according to each depth difference value.

According to one or more embodiments of the present disclosure, the fourth obtaining unit 341 further includes: an obtaining sub-unit 3413 configured to obtain input focusing point information.

The image blurring apparatus of this embodiment is configured to implement the corresponding image blurring method in the forgoing method embodiments, and has the beneficial effects of the corresponding method embodiments. Details are not described below again.

Figure 10:
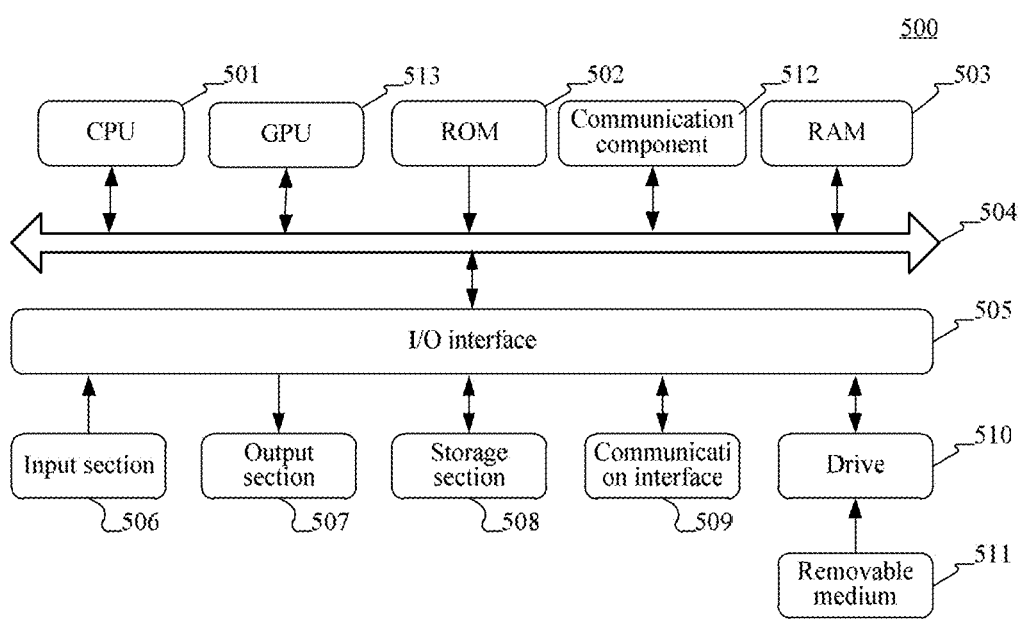
FIG. 10 illustrates a structural schematic diagram of an electronic device according to one embodiment of the present disclosure.

The embodiments of the present disclosure further provide an electronic device which, for example, may be a mobile terminal, a Personal Computer (PC), a tablet computer, a server, and the like. Referring to FIG. 10 below, a schematic structural diagram of an electronic device 500 adapted to implement a terminal device or a server according to the embodiments of the present disclosure is shown.

As shown in FIG. 10, the electronic device 500 includes one or more processors, a communication element, and the like. The one or more processors are, for example, one or more Central Processing Units (CPUs) 501 and/or one or more Graphic Processing Units (GPUs) 513, and the processors may execute an appropriate action and processing according to an executable instruction stored in a Read-Only Memory (ROM) 502 or an executable instruction loaded from a storage section 508 to a Random Access Memory (RAM) 503. The communication element includes a communication component 512 and a communication interface 509. The communication component 512 may include, but is not limited to, a network card. The network card may include, but is not limited to, an InfiniBand (IB) network card. The communication interface 509 includes a communication interface of a network interface card such as an LAN card and a modem, and the communication interface 509 performs communication processing via a network such as the Internet.

The processors may communicate with the ROM 502 and/or the RAM 503 to execute the executable instruction, and may be connected to the communication component 512 by means of a bus 504 and thus communicate with other target devices by means of the communication component 512, so as to complete the corresponding operations of any method provided by the embodiments of the present disclosure, for example, obtaining a main image and a secondary image obtained by photographing the same object with a dual-lens camera, obtaining depth data and depth confidence degree data according to the main image and the secondary image, the depth data indicating depth values of corresponding pixel points in the main image and the secondary image, and the depth confidence degree data indicating confidence degrees of the depth values in the depth data, correcting at least one depth value in the depth data according to the depth confidence degree data, and blurring the main image according to corrected depth data.

In addition, the RAM 503 may further store various programs and data required for operations of an apparatus. The CPU 501, the ROM 502, and the RAM 503 are connected to each other via the bus 504. In the presence of the RAM 503, the ROM 502 is an optional module. The RAM 503 stores executable instructions, or writes the executable instructions into the ROM 502 during running, where the executable instructions cause the CPU 501 to execute corresponding operations of the foregoing communication method. An Input/Output (I/O) interface 505 is also connected to the bus 504. The communication component 512 may be integrated, or may be configured to have a plurality of sub-modules (for example, a plurality of IB network cards) linked on the bus.

The following parts are connected to the I/O interface 505: an input section 506 including a keyboard, a mouse and the like; an output section 507 including a Cathode-Ray Tube (CRT), a Liquid Crystal Display (LCD), a loudspeaker and the like; a storage section 508 including hardware and the like; and the communication interface 509 of a network interface card including an LAN card, a modem and the like. A drive 510 is also connected to the I/O interface 505 according to requirements. A removable medium 511 such as a magnetic disk, an optical disk, a magneto-optical disk, a semiconductor memory or the like is mounted on the drive 510 according to requirements, so that a computer program read from the removable medium is installed on the storage section 508 according to requirements.

It should be noted that the architecture illustrated in FIG. 10 is merely an optional implementation. During practice, the number and types of the parts in FIG. 10 may be selected, decreased, increased, or replaced according to actual requirements. Different functional parts may be separated or integrated or the like. For example, the GPU 513 and the CPU 501 may be separated, or the GPU 513 may be integrated on the CPU 501, and the communication component 512 may be separated from or integrated on the CPU 501 or the GPU 513 or the like. These alternative implementations all fall within the scope of protection of the present disclosure.

Particularly, the process described above with reference to the flowchart according to the embodiments of the present disclosure is implemented as a computer software program. For example, the embodiments of the present disclosure include a computer program product, including a computer program tangibly included on a machine readable medium. The computer program includes program codes for executing the method shown in the flowchart. The program codes may include corresponding instructions for correspondingly executing the operations of the method provided in the embodiments of the present disclosure, for example, obtaining a main image and a secondary image obtained by photographing the same object with a dual-lens camera, obtaining depth data and depth confidence degree data according to the main image and the secondary image, the depth data indicating depth values of corresponding pixel points in the main image and the secondary image, and the depth confidence degree data indicating confidence degrees of the depth values in the depth data, correcting at least one depth value in the depth data according to the depth confidence degree data, and blurring the main image according to corrected depth data. In such embodiments, the computer program may be downloaded from a network by means of the communication element and installed, and/or be installed from the removable medium 511. The computer program, when being executed by the CPU 501, executes the foregoing functions defined in the method of the embodiments of the present disclosure.

The embodiments in the description are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods, apparatuses, and devices in the present disclosure are implemented in many manners. For example, the methods, apparatuses, and devices in the present disclosure are implemented with software, hardware, firmware, or any combination of software, hardware, and firmware. The foregoing sequence of the operations of the method is merely for description, and unless otherwise stated particularly, the operations of the method in the present disclosure are not limited to the described sequence. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The descriptions above only involve implementations of the embodiments of the present disclosure. However, the scope of protection of the embodiments of the present disclosure is not limited thereto. Within the technical scope disclosed by the embodiments of the present disclosure, any variation or substitution that can be easily conceived of by persons skilled in the art should all be included within the scope of protection of the embodiments of the present disclosure. Therefore, the scope of protection of the embodiments of the present disclosure should be defined by the scope of protection of the claims.

The invention claimed is:

1. An image blurring method, comprising:
obtaining a main image and a secondary image obtained by photographing a same object with a dual-lens camera;
obtaining, according to the main image and the secondary image, depth data and depth confidence degree data, the depth data indicating depth values of corresponding pixel points in the main image and the secondary image, and the depth confidence degree data indicating confidence degrees of the depth values in the depth data;
correcting, according to the depth confidence degree data, at least one depth value in the depth data; and
blurring, according to corrected depth data, the main image,
wherein the obtaining, according to the main image and the secondary image, the depth confidence degree data comprises: in response to the corresponding pixel points in the main image and the secondary image have the same depth value, assigning a depth confidence degree value greater than a reference value to each of the corresponding pixel points.

2. The method according to claim 1, wherein the obtaining, according to the main image and the secondary image, the depth confidence degree data further comprises at least one of:
in response to the depth value of the pixel points in the main image exceeds a preset range, assigning a depth confidence degree value smaller than the reference value to each of the pixel points of which the depth value exceeding the preset range; or,
in response to the pixel points in the main image have two or more depth values, assigning a depth confidence degree value smaller than the reference value to each of the pixel points having two or more depth values.

3. The method according to claim 1, wherein the correcting, according to the depth confidence degree data, at least one depth value in the depth data comprises:
replacing a depth value of a pixel point having the minimum depth confidence degree value with a depth value of a neighboring pixel point having the maximum depth confidence degree value.

4. The method according to claim 1, before the blurring, according to corrected depth data, the main image, further comprising:
de-noising the depth data.

5. The method according to claim 4, wherein the de-noising comprises:
filtering the depth data by using a filter; and/or,
increasing the depth values in the depth data according to a preset proportion.

6. The method according to claim 1, wherein the obtaining, according to the main image and the secondary image, the depth data comprises:
performing stereo matching on the main image and the secondary image to obtain initial depth data; and
performing depth calibration on the initial depth data to position the corresponding pixel points of the main image and the secondary image at the same depth to obtain the depth data.

7. The method according to claim 1, wherein the blurring, according to corrected depth data, the main image comprises:
obtaining, according to the corrected depth data, desired blurring data of each first pixel point in the main image, wherein the desired blurring data of each first pixel point in the main image is configured to indicate a desired blurring degree for blurring each first pixel point in the main image; and
blurring, according to the desired blurring data of each first pixel point, the main image.

8. The method according to claim 7, wherein the blurring, according to the desired blurring data of each first pixel point, the main image comprises:
generating a blurred image of which a pixel point corresponds to the first pixel point of the main image and a pixel value is an initial value;
respectively determining an initial blurring weight value of a corresponding second pixel point in the blurred image according to the desired blurring data of each first pixel point in the main image;
performing at least one update on at least one second pixel point in the blurred image, the update comprising: updating, according to a pixel value of a first pixel point and a current blurring weight value of a second pixel point corresponding to the first pixel point, a current pixel value and a current blurring weight value of at least one neighboring second pixel point of the corresponding second pixel point; and
obtaining, according to the updated blurred image, a blurring result of the main image.

9. The method according to claim 8, wherein a distance between the neighboring second pixel point and the corresponding second pixel point meets a set requirement.

10. The method according to claim 9, wherein a distance between the neighboring second pixel point and the corresponding second pixel point meets a set requirement, wherein the desired blurring data of the first pixel point comprises: a blurring radius; and
a distance between the neighboring second pixel point and the corresponding second pixel point meeting a set requirement comprises: the distance between the neighboring second pixel point and the corresponding second pixel point is smaller than or equal to the blurring radius.

11. The method according to claim 8, wherein the obtaining, according to the updated blurred image, a blurring result of the main image comprises:
normalizing, according to a current pixel value and a current blurring weight value of each second pixel point in the updated blurred image, the pixel value of each second pixel point in the blurred image, and using the normalized blurred image as the blurring result.

12. The method according to claim 7, before the obtaining, according to the corrected depth data, desired blurring data of each first pixel point in the main image, further comprising:
obtaining input focusing point information;
wherein the obtaining, according to the corrected depth data, desired blurring data of each first pixel point in the main image comprises:
determining, according to the depth data, a depth difference value between each first pixel point in the main image and a predetermined focusing point in the main image; and respectively determining the desired blurring data of each first pixel point according to each depth difference value.

13. The method according to claim 12, before the obtaining desired blurring data of each first pixel point in the main image according to the corrected depth data, further comprising:

obtaining input focusing point information.

14. An electronic device, comprising:

a processor; and a memory for storing instructions executable by the processor;

wherein execution of the instructions by the processor causes the processor to perform:

obtaining a main image and a secondary image obtained by photographing a same object with a dual-lens camera;

obtaining, according to the main image and the secondary image, depth data and depth confidence degree data, the depth data indicating depth values of corresponding pixel points in the main image and the secondary image, and the depth confidence degree data indicating confidence degrees of the depth values in the depth data;

correcting, according to the depth confidence degree data, at least one depth value in the depth data; and blurring, according to corrected depth data, the main image, wherein the obtaining, according to the main image and the secondary image, the depth confidence degree data comprises: in response to the corresponding pixel points in the main image and the secondary image have the same depth value, assigning a depth confidence degree value greater than a reference value to each of the corresponding pixel points.

15. The electronic device according to claim 14, wherein the obtaining, according to the main image and the secondary image, the depth confidence degree data further comprises at least one of:

in response to the depth value of the pixel points in the main image exceeds a preset range, assigning a depth confidence degree value smaller than the reference value to each of the pixel points of which the depth value exceeding the preset range; or, in response to the pixel points in the main image have two or more depth values, assigning a depth confidence degree value smaller than the reference value to each of the pixel points having two or more depth values.

16. The electronic device according to claim 14, before the blurring, according to corrected depth data, the main image, further comprising:

de-noising the depth data, wherein the de-noising comprises at least one of the following operations:

filtering the depth data by using a filter; or, increasing the depth values in the depth data according to a preset proportion.

17. The electronic device according claim 14, wherein the obtaining, according to the main image and the secondary image, the depth data comprises:

performing stereo matching on the main image and the secondary image to obtain initial depth data; and performing depth calibration on the initial depth data to position the corresponding pixel points of the main image and the secondary image at the same depth to obtain the depth data.

18. The electronic device according to claim 14, wherein the blurring, according to corrected depth data, the main image comprises:

obtaining, according to the corrected depth data, desired blurring data of each first pixel point in the main image, wherein the desired blurring data of each first pixel point in the main image is configured to indicate a desired blurring degree for blurring each first pixel point in the main image; and blurring, according to the desired blurring data of each first pixel point, the main image.

19. The electronic device according to claim 18, wherein the blurring, according to the desired blurring data of each first pixel point, the main image comprises:

generating a blurred image of which a pixel point corresponds to the first pixel point of the main image and a pixel value is an initial value;

respectively determining an initial blurring weight value of a corresponding second pixel point in the blurred image according to the desired blurring data of each first pixel point in the main image;

performing at least one update on at least one second pixel point in the blurred image, the update comprising: updating, according to a pixel value of a first pixel point and a current blurring weight value of a second pixel point corresponding to the first pixel point, a current pixel value and a current blurring weight value of at least one neighboring second pixel point of the corresponding second pixel point; and obtaining, according to the updated blurred image, a blurring result of the main image.

20. A non-transitory computer-readable storage medium, configured to store computer-readable instructions, wherein execution of the instructions by the processor causes the processor to perform:

obtaining a main image and a secondary image obtained by photographing a same object with a dual-lens camera;

obtaining, according to the main image and the secondary image, depth data and depth confidence degree data, the depth data indicating depth values of corresponding pixel points in the main image and the secondary image, and the depth confidence degree data indicating confidence degrees of the depth values in the depth data;

correcting, according to the depth confidence degree data, at least one depth value in the depth data; and blurring, according to corrected depth data, the main image, wherein the obtaining, according to the main image and the secondary image, the depth confidence degree data comprises: in response to the corresponding pixel points in the main image and the secondary image have the same depth value, assigning a depth confidence degree value greater than a reference value to each of the corresponding pixel points.

* * * * *